(12) United States Patent
Bohlen

(10) Patent No.: US 9,759,185 B2
(45) Date of Patent: Sep. 12, 2017

(54) ROTOR BLADE FOR A WIND POWER PLANT

(71) Applicant: Wobben Properties GmbH, Aurich (DE)

(72) Inventor: Thomas Bohlen, Sudbrookmerland (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 327 days.

(21) Appl. No.: 14/394,022

(22) PCT Filed: Apr. 5, 2013

(86) PCT No.: PCT/EP2013/057262
§ 371 (c)(1),
(2) Date: Oct. 10, 2014

(87) PCT Pub. No.: WO2013/153009
PCT Pub. Date: Oct. 17, 2013

(65) Prior Publication Data
US 2015/0064017 A1    Mar. 5, 2015

(30) Foreign Application Priority Data
Apr. 13, 2012   (DE) .................. 10 2012 206 109

(51) Int. Cl.
*F03D 1/06*     (2006.01)
*F03D 13/10*    (2016.01)

(52) U.S. Cl.
CPC .......... *F03D 1/0675* (2013.01); *F03D 1/065* (2013.01); *F03D 1/0633* (2013.01); *F03D 1/0641* (2013.01); *F03D 13/10* (2016.05); *F05B 2240/302* (2013.01); *Y02E 10/721* (2013.01)

(58) Field of Classification Search
CPC ...... F03D 1/0633; F03D 1/0641; F03D 1/065; F03D 1/0675
See application file for complete search history.

(56) References Cited

U.S. PATENT DOCUMENTS

| | | | | |
|---|---|---|---|---|
| 4,668,169 A | * | 5/1987 | Perry | ..................... B64C 27/46 416/223 R |
| 5,474,415 A | | 12/1995 | Becker et al. | |
| 5,562,420 A | * | 10/1996 | Tangler | ................. F03D 1/0641 416/223 R |
| 6,899,523 B2 | | 5/2005 | Wobben | |

(Continued)

FOREIGN PATENT DOCUMENTS

| | | |
|---|---|---|
| CN | 101059119 A | 10/2007 |
| DE | 199 63 086 C1 | 6/2001 |

(Continued)

*Primary Examiner* — Woody Lee, Jr.
(74) *Attorney, Agent, or Firm* — Seed Intellectual Property Law Group LLP

(57) ABSTRACT

The invention concerns a rotor blade of a wind power installation, comprising a rotor blade root (4) for attachment of the rotor blade to a rotor hub and a rotor blade tip arranged at a side remote from the rotor blade root, as well as a wind power installation having such rotor blades. In that arrangement a relative profile thickness which is defined as the ratio of profile thickness to profile depth has a local maximum in a central region between rotor blade root and rotor blade tip.

13 Claims, 6 Drawing Sheets

(56) References Cited

U.S. PATENT DOCUMENTS

| | | | |
|---|---|---|---|
| 2004/0115057 A1* | 6/2004 | Wobben | F03D 1/0641 416/223 A |
| 2008/0069699 A1 | 3/2008 | Bech | |
| 2010/0196166 A1* | 8/2010 | Enevoldsen | F03D 1/0633 416/223 R |
| 2011/0150664 A1 | 6/2011 | Mickeler et al. | |
| 2011/0293432 A1* | 12/2011 | Hibbard | F03D 1/001 416/223 R |
| 2012/0280509 A1* | 11/2012 | Fukami | F03D 1/0633 290/55 |
| 2013/0115098 A1* | 5/2013 | Madsen | F03D 1/0641 416/241 R |

FOREIGN PATENT DOCUMENTS

| | | |
|---|---|---|
| DE | 103 07 682 A1 | 1/2004 |
| DE | 10 2008 033 411 A1 | 3/2009 |
| DE | 10 2008 052 858 A1 | 4/2010 |
| EP | 1 978 245 A1 | 10/2008 |
| EP | 2 339 171 A2 | 10/2014 |
| RU | 2359151 C1 | 6/2009 |
| WO | 2010/086297 A2 | 8/2010 |
| WO | 2012/007058 A1 | 1/2012 |
| WO | 2012/164305 A1 | 12/2012 |

\* cited by examiner

ROTOR BLADE FOR A WIND POWER PLANT

BACKGROUND

Technical Field

The invention concerns a rotor blade of a wind power installation, and a wind power installation.

Description of the Related Art

Rotor blades for wind power installations are generally known. Such rotor blades have a profile which takes into account the particular aerodynamic demands. Usually a wind power installation has an aerodynamic rotor with a plurality of rotor blades. Such a wind power installation is shown by way of example in FIG. 5. The aerodynamic properties of such rotor blades are crucial as they greatly influence the operational efficiency of the rotor blades and thus the wind power installation. The profiles are optimized to increase the operational efficiency of the rotor blades. To ensure current production which is as steady as possible for example in regions involving a light wind, more specifically in particular at on-shore locations, the aerodynamic rotor blades are of a rotor diameter which can be more than 80 meters. In the case of such large wind power installations and thus also very large rotor blades, that results in the rotor blade being of a great weight. The large heavy rotor blades generate high loads which in operation act on the wind power installation. In addition production and transport to the respective erection locations is complicated and difficult. Implementation of a rotor blade which is divided into two and which would be more appropriate for transport of such large rotor blades is however only limitedly possible, because of the loads which occur and because of the reduction in stability which additionally occurs due to the separation location.

The German Patent and Trade Mark Office searched the following state of the art in the priority application: DE 10 2008 052 858 A1, DE 10 2008 033 411 A1, DE 103 07 682 A1, U.S. Pat. No. 5,474,415 A and EP 2 339 171 A2.

BRIEF SUMMARY

One or more embodiments of the present invention provides a rotor blade which is of low weight with a maximum level of stiffness, by which the loads on the machine structure and the pylon are reduced, and which is simple to transport. The invention seeks at least to propose an alternative solution.

According to one embodiment of the invention there is provided a rotor blade of a wind power installation that has a rotor blade root for attaching the rotor blade to a rotor hub and a rotor blade tip arranged at a side remote from the rotor blade root. In that case a relative profile thickness which is defined as the ratio of profile thickness to profile depth has a local maximum in a central region between rotor blade root and rotor blade tip. Hereinafter the term profile depth is used to denote the length of the profile, that is to say the spacing between the profile leading edge and the profile trailing edge. The profile thickness denotes the spacing between the top side and the underside of the profile. The relative profile thickness is thus of a small value if the profile thickness is small and/or the profile depth is large.

The relative profile thickness has a local maximum between the rotor blade root and the rotor blade tip. The local maximum is in the central region between the rotor blade root and the rotor blade tip, preferably in a region of 30 to 60% of the total length of the rotor blade, measured from the rotor blade root to the rotor blade tip. With a total length of for example 60 meters, the local maximum is thus in a region of preferably 18 meters to 36 meters. The relative profile thickness thus initially falls, starting from the rotor blade root, and then rises in the central region again to the local maximum, namely to a location, in the area surrounding which the relative profile thickness does not involve a higher value. The local maximum in the central region of the rotor blade is afforded in particular by the profile depth decreasing greatly from the rotor blade root to the central region. At the same time or alternatively the profile thickness can be increased or may not decrease as greatly as the profile depth. That achieves a saving on material, in particular between the rotor blade root and the central region, and thus a saving in weight. A high level of stability is achieved for the rotor blade by the increase in profile thickness.

It was realized that a reduction in the profile depth in the central region can admittedly result in a reduction in load-carrying capacity there, but at the same time a reduction in the weight of the rotor blade is achieved. Any worsening in the efficiency of the rotor blade is accepted to achieve a lower weight. In that respect, the focus is directed more greatly to stability and stiffness in the central region, with the maximum level of efficiency, while in the outer region the greater focus is on high efficiency. Thus there is proposed a profile in which the profile depth decreases from the central region outwardly towards the rotor blade tip at least to a lesser degree than in the central region.

Preferably the relative profile thickness of the local maximum is 35% to 50%, in particular 40% to 45%. Usually the relative profile thickness begins at the rotor blade root, with a value of 100% to 40%. A value of about 100% means in that respect that the profile thickness is approximately identical to the profile depth. After that the value falls monotonically. In an embodiment according to the invention the value initially drops, starting from the rotor blade root, until it reaches a local minimum. After the local minimum the relative profile thickness involves an increase until it is about 35% to 50%.

In a preferred embodiment the rotor blade in the central region and/or in the region of the local maximum has a profile depth of 1500 mm to 3500 mm, in particular about 2000 mm. If the rotor blade in the region of the rotor blade root has a profile depth of about 6000 mm the profile depth therefore falls by about a third as far as the central region and/or the region of the local maximum.

In a particularly preferred embodiment the rotor blade is composed of a first and a second rotor blade portion, and the first rotor blade portion has the rotor blade root and the second rotor blade portion has the rotor blade tip. The first and the second rotor blade portions are connected together at a separation location. In that case the separation location is arranged in the central region between the rotor blade root and the rotor blade tip and/or in the region of the local maximum.

Assembling the rotor blade from two rotor blade portions provides that transport of the rotor blade to the appropriate erection location of the wind power installation is considerably facilitated. If the separation location is in the central region, that means, with a rotor diameter of over 80 meters, that for example there are only still two rotor blade portions each of about 40 that have to be transported. In addition, in the central region and/or in the region of the local maximum of the relative profile thickness, in particular the profile depth is small with a large profile thickness. As a result, the rotor blade is of a stable configuration at that location. The additional loadings occurring due to the separation location are thus very substantially absorbed.

Preferably the rotor blade is designed for a tip speed ratio in a range of 7 to 10, preferably 8 to 9. In that respect the tip speed ratio is defined as the ratio of peripheral speed at the rotor blade tip to the wind speed. High design tip speed ratios lead to a high performance coefficient and can result in slender, rapidly rotating blades.

In a further embodiment in a region of 90% to 95% of the total length of the rotor blade, measured from the rotor blade root to the rotor blade tip, the rotor blade has a profile depth which corresponds to about 5% to 15%, in particular about 10%, of the profile depth in the region of the rotor blade root.

Such a reduced profile depth in the region of the rotor blade tip reduces loads acting on the machine structure and the pylon, in particular aerodynamic loads. Basically a comparatively slender rotor blade is proposed.

In a preferred embodiment at the rotor blade root the rotor blade has a profile depth of at least 3900 mm, in particular in a region of 4000 mm to 8000 mm, and/or in the region of 90% to 95% of the total length, in particular at 90%, starting from the rotor blade root, it has a profile depth of a maximum of 1000 mm, in particular in a region of 700 mm to 400 mm.

Preferably in the central region, in particular at 50% of the total length of the rotor blade and/or in the region of the local maximum, the rotor blade has a profile depth which corresponds to about 20% to 30%, in particular about 25%, of the profile depth in the region of the rotor blade root. If for example the profile depth is 6000 mm in the region of the rotor blade root, then the profile depth corresponds only to about 1500 mm in the region of the local maximum and/or in the central region. That rapid decrease in the profile depth from the rotor blade root to the central region provides a slender profile with low loads, in particular aerodynamic loads. The loads are less than in the case of other known rotor blades. In the known profiles, the rotor blade depth usually decreases substantially linearly. As a result a greater profile depth is present in particular between the rotor blade root and the central region, and thus this also involves more material.

In addition according to one embodiment of the invention there is proposed a wind power installation having at least one rotor blade according to at least one of the foregoing embodiments. Such a wind power installation is economically efficient due to the at least one slender and rapidly rotating rotor blade, due to a high design tip speed ratio, and a high performance coefficient. As a result the wind power installation is particularly suitable also for operation in the part-load range and/or for light wind and thus also for on-shore locations. The wind power installation preferably has three rotor blades.

BRIEF DESCRIPTION OF THE SEVERAL VIEWS OF THE DRAWINGS

The invention is described in greater detail hereinafter by means of embodiments by way of example with reference to the accompanying Figures. The Figures set forth partly simplified diagrammatic views.

DETAILED DESCRIPTION

Figure 1:
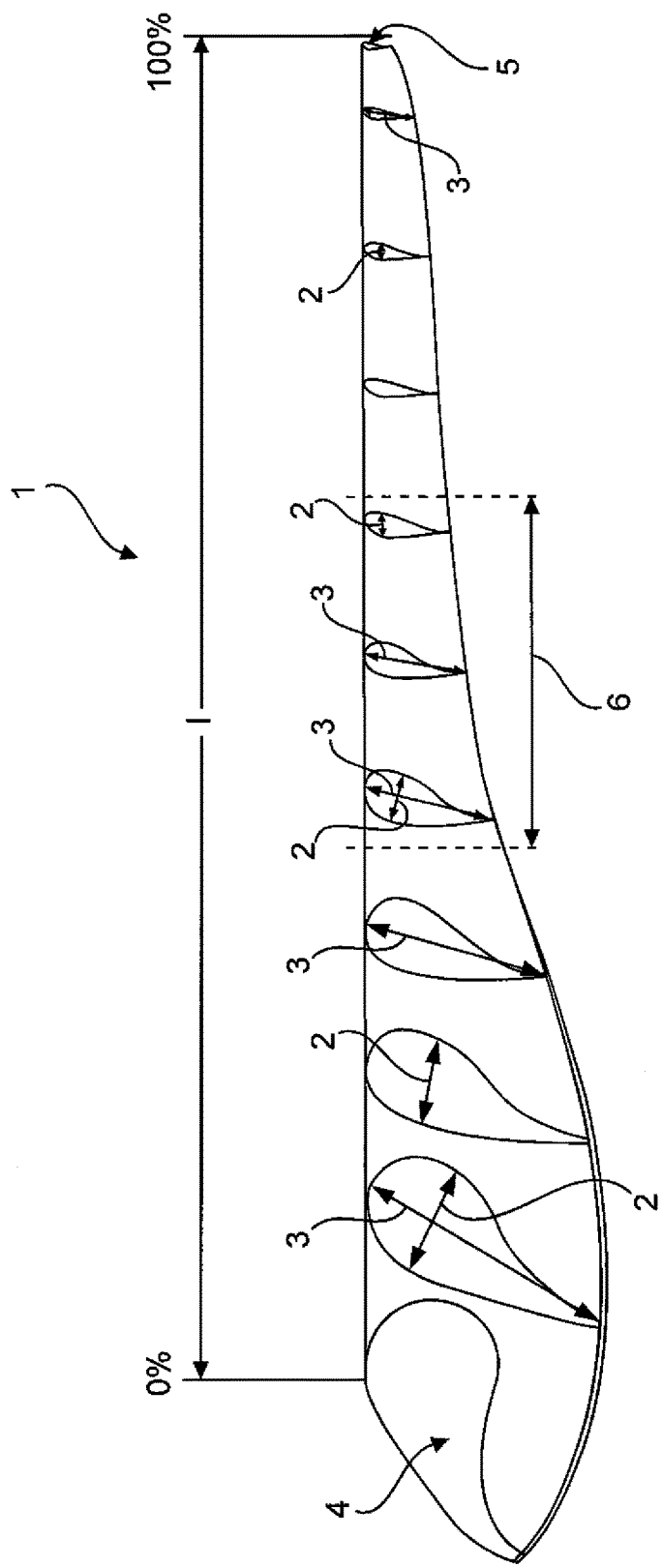
FIG. 1 shows a diagrammatic view of a rotor blade.

FIG. 1 shows a distribution of various profile geometries of a rotor blade 1 of an embodiment. Profile thicknesses 2 and profile depths 3 are shown in portion-wise manner in the rotor blade 1. The profile depths 3 measure the depth of the rotor blade from a curved edge (foreground) to a substantially flat edge (background). The profile thickness 2 measures the thicknesss of the rotor blade in vertical planes of the page. At one end the rotor blade 1 has the rotor blade root 4 and at the end remote therefrom it has a connecting region 5 for the attachment of a rotor blade tip. At the rotor blade root 4 the rotor blade has a large profile depth 3. In the connecting region 5 in contrast the profile depth 3 is very much smaller. The profile depth decreases markedly from the rotor blade root 4 which can also be referred to as the profile root 4, to a central region 6. A separation location (not shown here) can be provided in the central region 6. The profile depth 3 is almost constant from the central region 6 to the connecting region 5. The illustrated rotor blade 1 is intended for attachment of a small rotor blade tip, which constitutes less than 1% of the length of the illustrated rotor blade 1 and can therefore be disregarded here.

Figure 2:
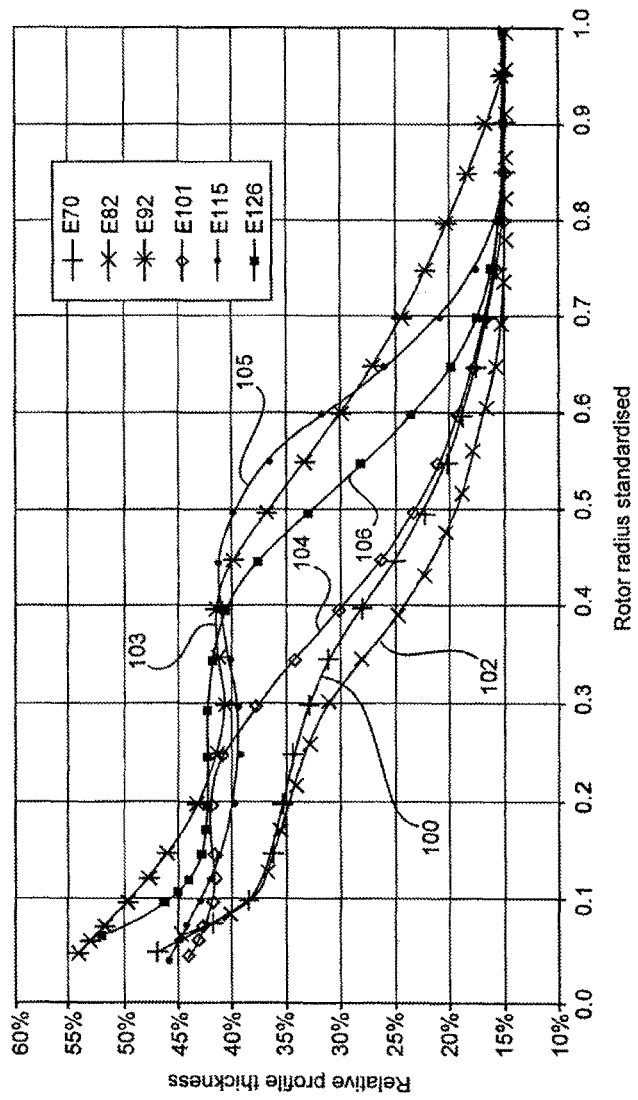
FIG. 2 shows a graph illustrating the relative profile thickness relative to the standardized rotor radius.

FIG. 2 shows a graph in which the relative profile thickness is respectively shown relative to the standardized rotor radius, for various rotor blades of a wind power installation. The relative profile thickness is specified in percent on the ordinate and extends in 5% steps from 10% to 60%. The standardized rotor radius is respectively specified on the abscissa from 0 to 1 in 0.1 steps. In this case the rotor radius respectively refers to a rotor with at least one rotor blade mounted to a rotor hub of the rotor. The length of the respective rotor blade extends from the rotor blade root to the rotor blade tip. The rotor blade begins with its rotor blade root approximately at a value of 0.05 of the standardized rotor radius and ends with its rotor blade tip at the value 1 of the standardized rotor radius. In the region of the rotor blade tip the value of the standardized rotor radius approximately corresponds to the percentage length of the rotor blade in question. In particular the value 1 of the standardized rotor radius is equal to 100% of the rotor blade length.

A total of six graph lines are to be seen in the graph. The graph lines represent the configuration of the relative profile thickness of rotor blades of various known and planned wind power installations from Enercon GmbH. In that case graph line 100 shows a wind power installation of a rotor diameter of about 70 m (type E-70), graph line 102 shows an installation with a rotor diameter of about 82 m (type E-82), graph line 103 shows an installation with a rotor diameter of about 92 m (type E-92), graph line 104 shows an installation with a rotor diameter of about 101 m (type E-101), graph line 105 shows an installation with a rotor diameter of about 115 m (type E-115), and graph line 106 shows an installation with a rotor diameter of about 126 m (type E-126). Graph lines 100, 102, 104 and 106 show known state of the art and graph lines 103 and 105 show the configuration of the relative profile thickness of a respective embodiment according to the invention. It can be seen from the graph lines that the configuration of the relative profile thickness in graph lines 100 and 102 is of a substantially monotonically falling configuration. The graph lines 100 and 102 begin in the region of the rotor blade root, that is to say between a standardized rotor radius of 0.0 and 0.1, with a relative profile thickness between 45% and 50%. The respective graph lines do not have any local maxima or minima, as far as the standardized rotor radius of 1.0. The values of the relative profile thickness steadily decrease.

The graph line 103 in accordance with the one embodiment begins with a relative profile thickness of about 55% at the rotor blade root, that is to say therefore approximately at a standardized rotor radius between 0 and 0.1, and then initially falls to a relative profile thickness of about 40%, with a standardized rotor radius of 0.3. After that the configuration of the relative profile thickness rises until it reaches its local maximum at about 42%, with a standardized rotor radius of 0.4. The relative profile thickness then rises again by 2% to its local maximum. The local maximum is in the central region of the rotor blade. It thus has a maximum deflection of more than 1%. After that the relative profile thickness is of a monotonically falling configuration to a value of about 15% as far as a standardized rotor radius of 1.0 and thus a rotor blade length of 100%.

The configuration of the graph line 105 of the further embodiment is similar to that of the graph line 103. The relative profile thickness begins at the rotor blade root at about 45%, then falls in the case of a standardized rotor radius of about 0.25 to a value of below 40% and thereafter rises. With a standard rotor radius of about 0.45 the value of the relative profile thickness reaches a local maximum at a value of about 42%. That corresponds to a rise again of about 3%. Then the configuration of the relative profile thickness is of a substantially monotonically falling nature, until at a relative profile thickness of about 0.8 the value of 15% is reached. The further configuration as far as the rotor blade tip remains approximately constant at 15%.

In contrast to the graph lines 100 and 102 the graph lines 103 and 105 have a local maximum in the central region. The local maximum is produced here by a reduction in the profile depth with at the same time a smaller reduction in the profile thickness in that region. The profile achieved by that configuration in respect of the relative profile thickness is a slender rotor blade which, in contrast to the known rotor blades, carries loads which are lower by virtue of the fact that the profile depth firstly decreases rapidly starting from the rotor blade root over the entire length of the rotor blade. In that way aerodynamic loads are also reduced and thus the loads occurring at the machine casing are also reduced. In addition the rotor blade can be of a substantially constant profile thickness, from the central region. The rotor blade is afforded stability as a result of that. In the case of the known rotor blades the profile is substantially of a trapezoidal shape which can be noted in the graph by a monotonically falling configuration of the relative thickness.

The relative profile thickness of the graph line 104 begins at the rotor blade root with 44%. The relative profile thickness firstly falls at a standardized radius of 0.1 to a value of about 42%. Thereafter it rises slightly to a value of about 42.5% as far as a standardized rotor radius of 0.2, which approximately corresponds to 15% of the rotor blade length. The configuration of the graph line 104 thus admittedly has a local maximum which however is not in the central region of the rotor blade and which has a gradient that is scarcely worth mentioning. In particular such a configuration is also poorly suited to a two-part rotor blade with a separation location in the central region.

Figure 4:
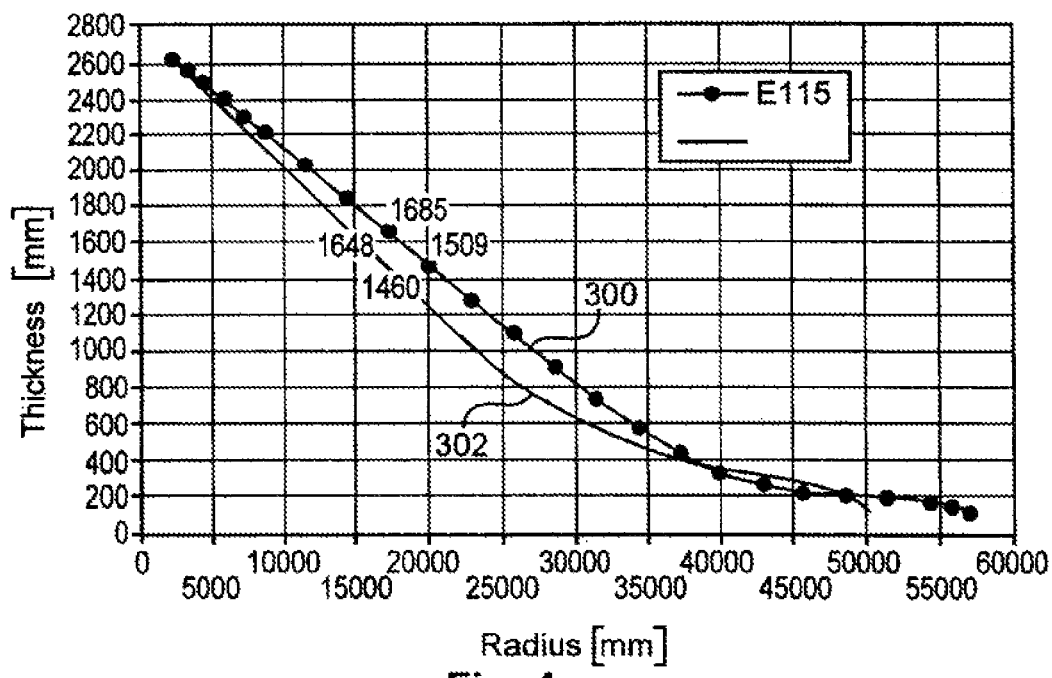
FIG. 4 shows a graph illustrating the thickness relative to the radius.

A linear thickness configuration from the rotor blade root to the central region, as is shown in FIG. 4 in both graph lines, is also advantageous. Such a linear configuration which the rotor blade in graph line 104 does not have is structurally advantageous. Such a rotor blade can be better produced and has a more uniform stress configuration. In addition, more uniform deformation is to be expected under the action of external loads. Such a linear configuration is basically advantageous, not just for the illustrated embodiments. The linear thickness configuration is proposed in the region of 5% to 25% of the total length of the rotor blade, preferably 5% to 35%, in particular from the rotor blade root to the central region.

The configuration of the relative profile thickness of the graph line 106 begins in the region of the rotor blade root at about 52%. The value then sinks to a standardized rotor radius of 0.2, at about 42.5%. Thereafter the relative profile thickness extends almost constantly or has a gradient that is not worth mentioning. That region can also be referred to as a saddle point in the mathematical sense. From a rotor radius of about 0.3 the relative profile thickness extends in a strictly monotonically falling configuration.

In the rotor blade root region, the configuration of the relative profile thickness of the illustrated embodiments does not begin at 100%, as would be the case with other known rotor blades. In this respect the profile depth and the profile thickness are almost identical in the region of the rotor blade root. Rather, the illustrated configuration begins at between 40% and 55%. That has aerodynamic advantages, in particular in regard to turbulence formation in the region of the rotor blade root, which is suppressed or at least reduced by such a profile shape.

Figure 3:
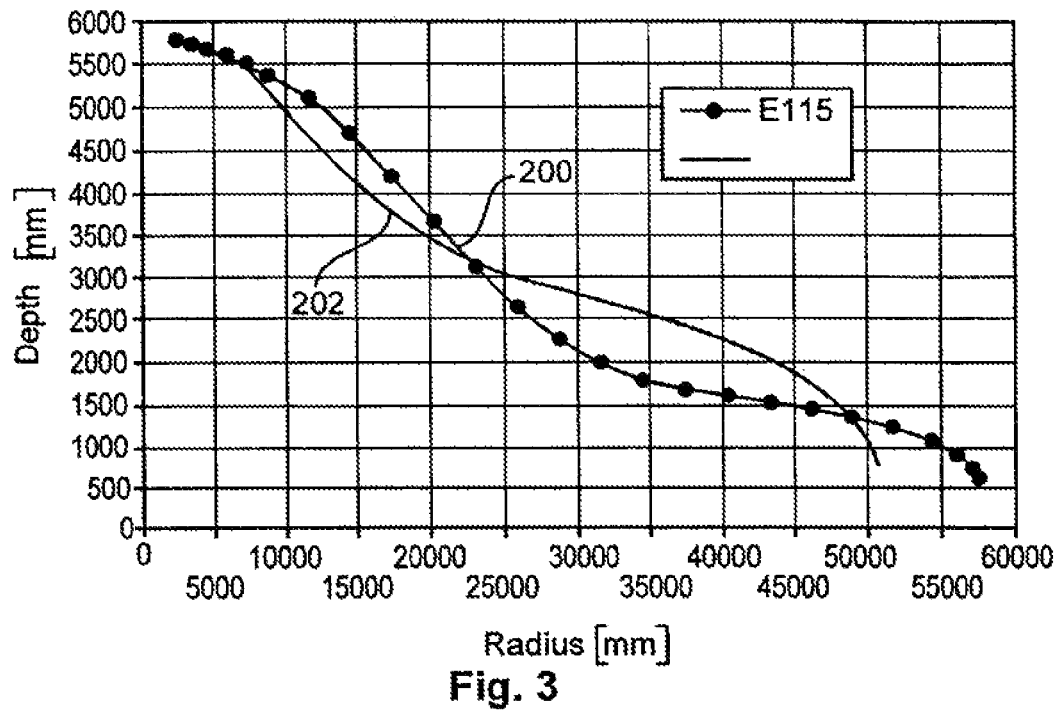
FIG. 3 shows a graph illustrating the depth relative to the radius.

FIG. 3 shows a graph which illustrates the profile depth—referred to in the graph in simplified fashion as the depth—in millimeters relative to the rotor radius—referred to in the graph in simplified fashion as the radius—in millimeters. The profile depth is shown in steps of 500 from 0 mm to 6000 mm. The rotor blade radius is shown in steps of 5000 from 0 mm to 60,000 mm. FIG. 3 shows two graph lines 200 and 202, wherein the graph line 200 represents the profile depth configuration of an embodiment according to the invention. The graph line 202 shows a graph configuration of another rotor blade for comparison purposes. Graph line 200 shows the profile depth configuration of a wind power installation from Enercon GmbH of type E-115.

The two graph lines 200, 202 begin at the rotor blade root with approximately the same profile depth. The profile depth is in a range of between 5500 mm and 6000 mm. After that both graph lines 200, 202 fall away until at a radius of between 20,000 mm and 25,000 mm they have reached a profile depth in a range of between 3000 mm and 3500 mm. After that the profile depth in the graph line 200 falls away markedly more than that of the graph line 202. For example at a radius of 25,400 mm the profile depth of the graph line 200 is already only still 2500 mm while that of the graph line 202 is still 3000 mm. At a radius of 35,000 mm the profile depth of the graph line 200 is only still about 1550 mm and that of the other graph line 202 is still 2500 mm. It is only in the region of the blade tip, that is to say at a radius in the range of between 55,000 mm and 60,000 mm that the profile depths again approximately coincide.

FIG. 4 shows a graph in which, in relation to the profile depths in FIG. 3, it respectively shows the profile thickness—referred to in the graph in simplified fashion as thickness—in millimeters relative to the rotor radius—referred to in the graph in simplified fashion as radius. The profile thickness is shown in 200 mm steps from 0 mm to 2800 mm. The radius is shown in 5000 mm steps from 0 mm to 60,000 mm. Two graph lines are shown, the first graph line 300 illustrating the profile thickness configuration of an embodiment according to the invention and the graph line 302 showing that of another rotor blade for comparison purposes. Graph line 300 shows the profile thickness configuration of a rotor blade of a wind power installation from Enercon GmbH of type E-115.

The rotor blade of the graphs 200 and 300 in FIGS. 3 and 4 respectively has a local maximum in respect of the relative profile thickness in the central region between rotor blade root and rotor blade tip.

Figure 5:
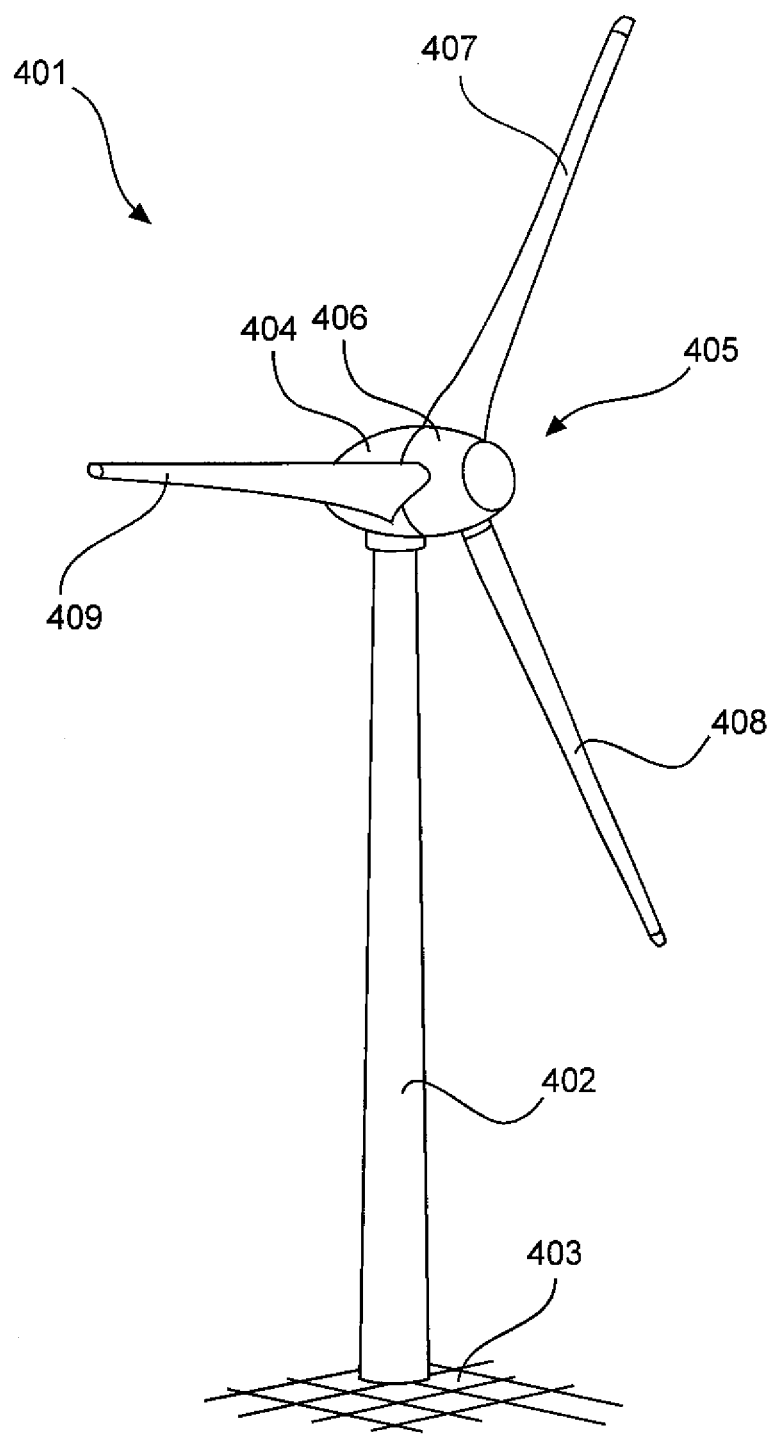
FIG. 5 shows a perspective view of a wind power installation.

FIG. 5 shows a wind power installation 400 comprising a pylon 402 erected on a foundation 403. Disposed at the upper end opposite to the foundation 403 is a pod 404 (machine casing) with a rotor 405 which substantially comprises a rotor hub 406 and rotor blades 407, 408 and 409 mounted thereto. The rotor 405 is coupled to an electric generator in the interior of the pod 404 for converting mechanical work into electric energy. The pod 404 is mounted rotatably on the pylon 402, the foundation 403 of which gives the necessary erection stability.

Figure 6:
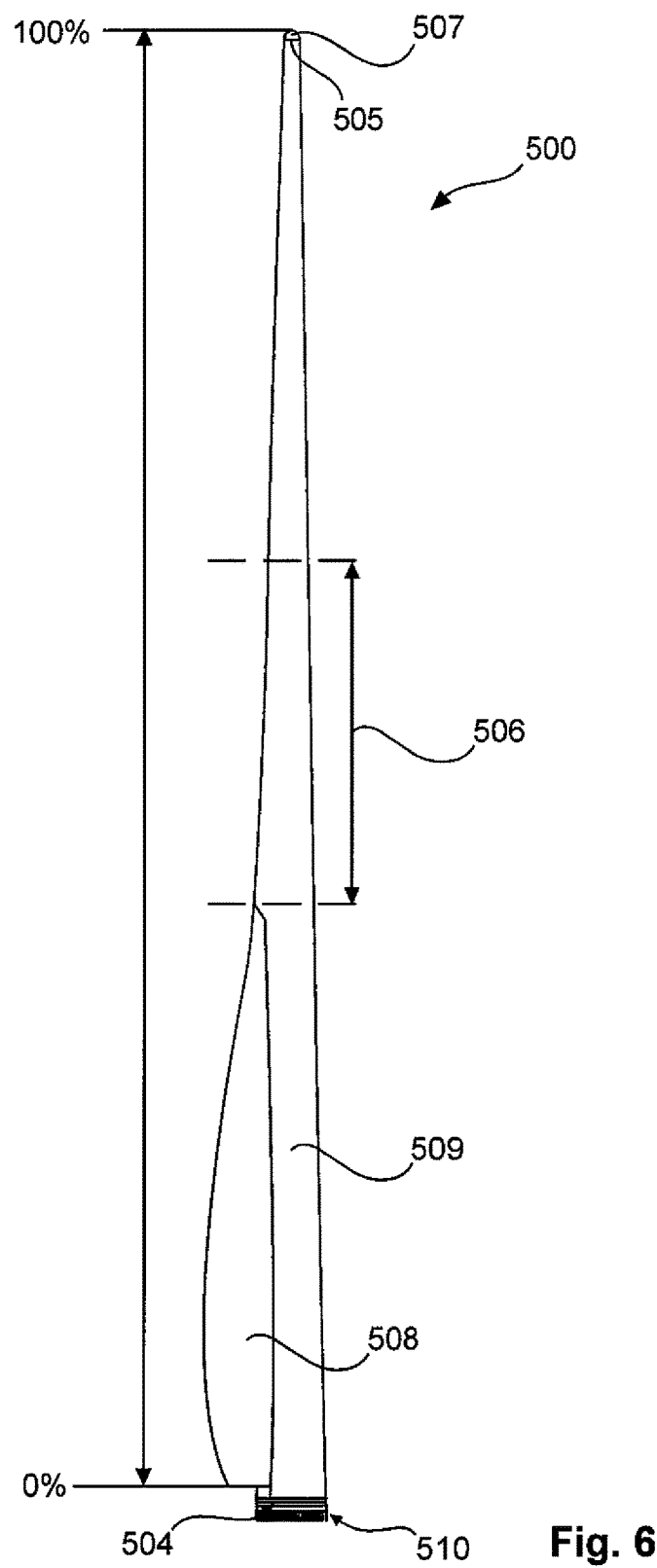
FIG. 6 shows a side view of a rotor blade.

FIG. 6 shows a side view of a rotor blade 500 of an embodiment over its entire length l, that is to say from 0% to 100%. At one end the rotor blade 500 has a rotor blade root 504 and at the end remote therefrom it has a rotor blade tip 507. The rotor blade tip 507 is connected at a connecting region 505 to the remaining part of the rotor blade. At the rotor blade root 504 the rotor blade is of a great profile depth. In contrast the profile depth is very much smaller in the connecting region 505 and at the rotor blade tip 507. Starting from the rotor blade root 504 which can also be referred to as the profile root 504, the profile depth decreases markedly to a central region 506. A separation location (not shown here) can be provided in the central region 506. The profile depth is almost constant from the central region 506 to the connecting region 505.

The rotor blade 500 is of a form in which it is divided into two, in the region of the rotor blade root 504. The rotor blade 500 thus comprises a basic profile 509 on which a further portion 508 is arranged in the region of the rotor blade root 504, to increase the rotor blade depth of the rotor blade 500. In this case the portion 508 is for example glued to the basic profile 509. Such a two-part form is simpler in terms of handling in transport to the erection location and easier to manufacture.

It is also possible to see a hub connecting region 510 in FIG. 6. The rotor blade 500 is connected to the rotor hub by way of the hub connecting region 510.

Figure 7:
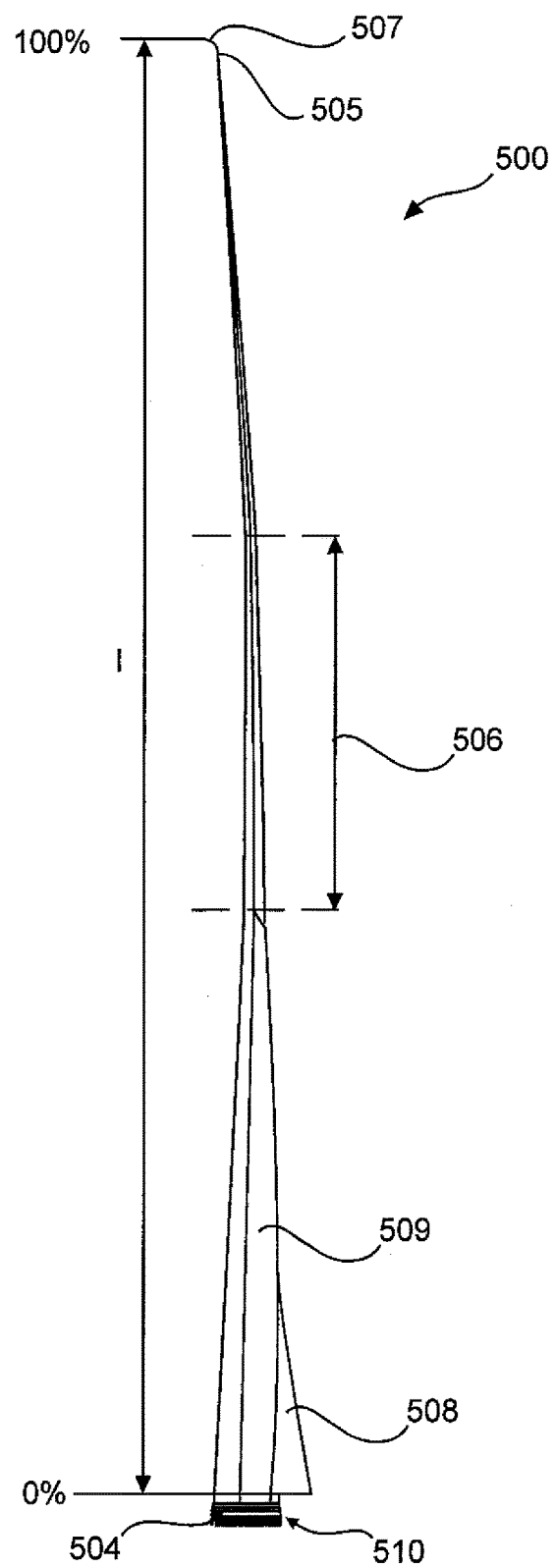
FIG. 7 shows a further side view of the rotor blade of FIG. 6.

FIG. 7 shows a further side view of the rotor blade 500 in FIG. 6. It is possible to see the rotor blade 500 with the basic profile 509, the portion 508 for increasing the rotor blade depth, the central region 506, the rotor blade root 504 and the hub connecting region 510 as well as the connecting region 505 to the rotor blade tip 507. The rotor blade tip 507 is in the form of a so-called winglet. That reduces turbulence at the rotor blade tip.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rotor blade of a wind power installation, the rotor blade comprising:
   a rotor blade root region including a rotor blade root for attachment of the rotor blade to a rotor hub,
   a rotor blade tip arranged at a side remote from the rotor blade root, and
   a relative profile thickness, that is defined as a ratio of a profile thickness to a profile depth, has a local maximum in a central region that is between 30% to 60% of a length of the rotor blade, wherein the local maximum is formed due to a reduced profile depth in the central region and a reduced profile thickness in the central region relative to the rotor blade root region, wherein the reduction in the profile thickness is an amount that is less than an amount at which the profile depth is reduced.

2. The rotor blade according to claim 1 wherein the relative profile thickness of the local maximum is 0.35 to 0.50.

3. The rotor blade according to claim 2 wherein the relative profile thickness of the local maximum is between 0.40 to 0.45.

4. The rotor blade according to claim 1 wherein in the central region of the rotor blade, the rotor blade has a profile depth of 1500 mm to 3500 mm.

5. The rotor blade according to claim 4 wherein the profile depth is 2000 mm.

6. The rotor blade according to claim 1 wherein:
   the rotor blade has a first blade portion and a second rotor blade portion, and
   the first rotor blade portion has the rotor blade root and the second rotor blade portion has the rotor blade tip, and
   the first and the second rotor blade portions are coupled together at the central region between the rotor blade root and the rotor blade tip.

7. The rotor blade according to claim 1 wherein the rotor blade is configured to have a tip speed ratio in a range of 7 to 10.

8. The rotor blade according to claim 1 wherein in a region of 90% to 95% of a total length of the rotor blade, measured from the rotor blade root to the rotor blade tip, at least one of the following applies:
   the rotor blade has a profile depth that corresponds to about 5% to 15% of the profile depth in the region of the rotor blade root, and
   the rotor blade has a linear thickness configuration at 5% to 35% of the total length of the rotor blade.

9. The rotor blade according to claim 1 wherein at the rotor blade root, the rotor blade has a profile depth between 3900 mm to 8000 mm.

10. The rotor blade according to claim 1 wherein in the central region, the rotor blade has a profile depth that corresponds to about 20% to 30% of the profile depth in the region of the rotor blade root.

11. The rotor blade according to claim 1 wherein at a region of 90% to 95% of a total length of the rotor blade starting from the rotor blade root, the rotor blade has a profile depth of between 400 mm to 1000 mm.

12. A wind power installation comprising:
    a rotor hub; and a rotor blade having:
- a rotor blade root region at a first end, the rotor blade root region including a rotor blade root coupled to the rotor hub;
- a rotor blade tip at a second end; and
- a relative profile thickness has a local maximum in a central region that is between 30% to 60% of a length of the rotor blade, the relative profile thickness being defined as a ratio of a profile thickness of the rotor blade to a profile depth of the rotor blade, wherein the local maximum is formed due to a reduced profile depth in the central region and a reduced profile thickness in the central region relative to the rotor blade root region, wherein the reduction in the profile thickness is an amount that is less than an amount at which the profile depth is reduced.

13. The wind power installation according to claim 12 wherein the rotor blade is one of a plurality of rotor blades coupled to the rotor hub.

\* \* \* \* \*